Figure 1:
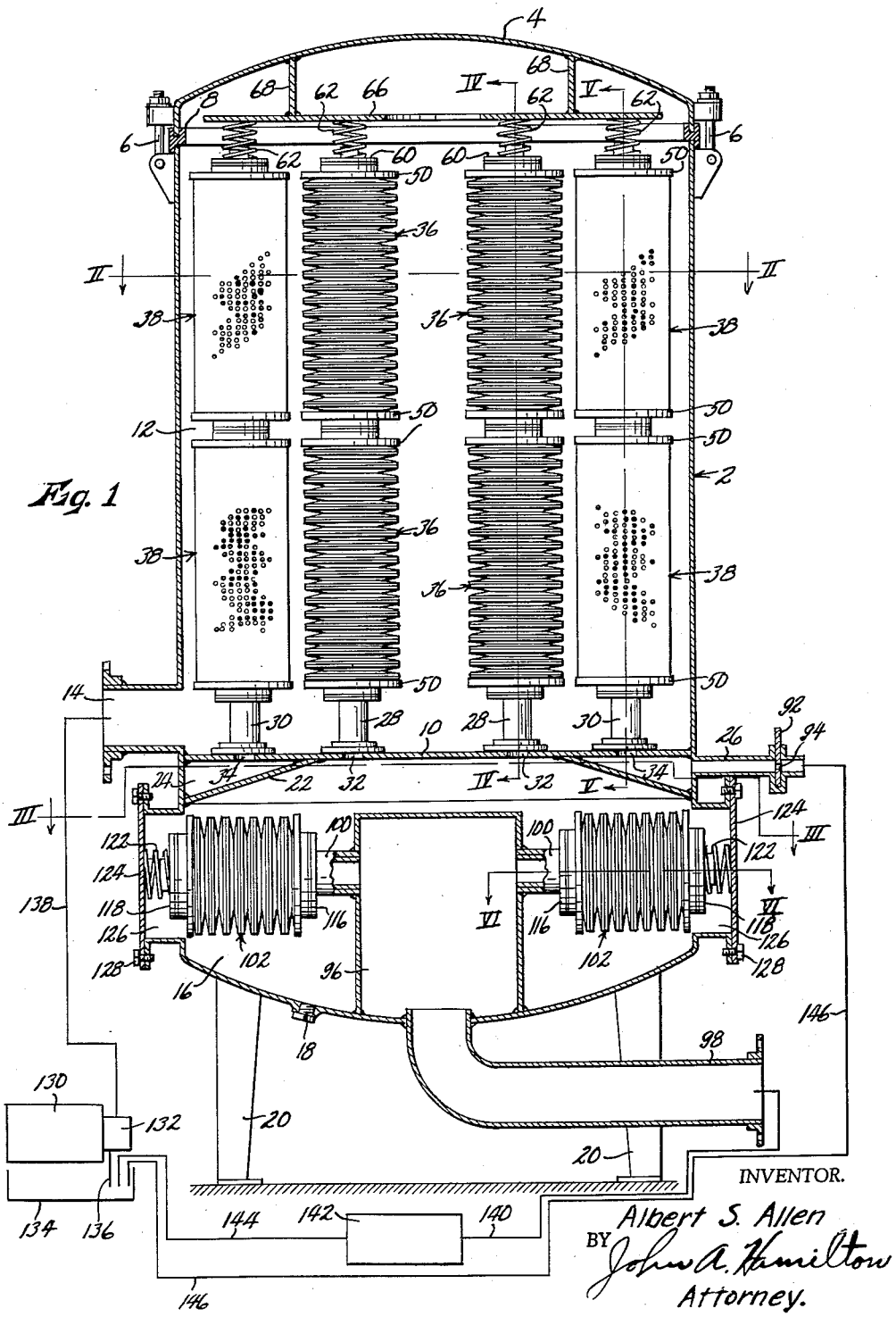

Dec. 27, 1960 A. S. ALLEN 2,966,269
COMBINED FULL-FLOW AND BY-PASS FILTER WITH STRAINER
Filed July 9, 1958 3 Sheets-Sheet 2

INVENTOR.
Albert S. Allen
BY John A. Hamilton
Attorney.

Dec. 27, 1960    A. S. ALLEN    2,966,269
COMBINED FULL-FLOW AND BY-PASS FILTER WITH STRAINER
Filed July 9, 1958    3 Sheets-Sheet 3

INVENTOR.
Albert S. Allen
BY John A. Hamilton
Attorney.

United States Patent Office

2,966,269
COMBINED FULL-FLOW AND BY-PASS FILTER WITH STRAINER

Albert S. Allen, Springfield, Mo., assignor to Hoffman-Allen Corporation, Springfield, Mo., a corporation of Missouri Filed July 9, 1958, Ser. No. 747,433

2 Claims. (Cl. 210—132)

This invention relates to new and useful improvements in filters, and has particular reference to a combination of full-flow and by-pass filters.

In the filtration of oil, as for example in the lubrication systems of internal combustion engines in large installations, it has been found advantageous to employ a combination full-flow and by-pass system. Such a system incorporates "full-flow" filtering units capable of filtering the entire flow of oil. These units are usually of the "surface" type wherein the oil flows through a single layer of filter paper or the like. They have a high flow rate, and may be of reasonably compact size and operate with the expenditure of relatively low pump power, but are not sufficiently efficient to remove all foreign matter from the oil. Continued operation will permit a gradual increase of the amount of said foreign matter in the oil, particularly oxides and very fine sludges. To eliminate this gradual build-up of impurities, the combination system by-passes a portion (perhaps 5%–10%) of the oil from the full-flow units through by-pass filter units. The by-pass units are usually of the "depth" or "absorption" type wherein the oil passes through a thick bed of filtering material such as fuller's earth. These units are capable of removing substantially all filterable impurities from the oil, but are intrinsically of low capacity since they require much greater power to pump oil therethrough than does the full-flow unit, and since efficient operation requires retention of the oil in the unit for a relatively long period of time to allow absorption of impurities to take place. In most larger installations the filtering of all the oil through this type of filtering unit would be prohibitive in expense and in requirements of size, space and power.

The combination system wherein perhaps 5%–10% of the oil is processed through depth-type filtering units in each cycle of the oil has been found very effective in preventing build-up of impurities in the oil, and to produce an extremely efficient overall filtration, but nevertheless as heretofore practiced has been subject to certain disadvantages. The full-flow and by-pass filter units have ordinarily been supplied in separate housings or cases, which of course is relatively expensive and requires considerable space and extensive piping. The depth type by-pass filtering units cannot pass cold oil, and therefore have required steam, electric or other heating means to start and maintain the flow of oil therethrough. Each filtering unit has required a separate relief valve for safety, to by-pass oil around the filter whenever said filter becomes clogged or inoperative.

The principal object of the present invention is, therefore, the elimination of the above disadvantages. This object is accomplished generally by placing both the full-flow and by-pass filter units in the same casing with a common inlet but with separate outlets for the two types of filters. The flow of oil in the casing to the full-flow units circulates about the by-pass units, whereby to heat the latter to efficient operating temperature when the engine being served is fully warmed up. During this warm-up period the full-flow units handle the entire flow of oil and the engine is protected. Only the full-flow units are provided with safety relief valves. In this manner the system is protected against oil stoppage due to clogging of either type of oil unit due to the inclusion of both units in a single casing. The number of safety relief valves required is thereby greatly reduced. The separate outlets from the two types of filter units may be relatively restricted as desired in order to provide proper proportioning of the oil between the full-flow and by-pass units for best operation, and to insure retention of oil in the by-pass units for sufficient time to provide for absorption of impurities therefrom.

Another object is the provision in a combination filter of the class described, of a strainer unit disposed in series, in the outlet passage of the full-flow units. This strainer provides at least a degree of filtration of the oil, and hence protection to the engine, even during initial operation of the engine when the oil may be too cold to pass even through the full-flow units and hence passes through the relief valves, and also when the full-flow units fail due to rupture of the filtering surfaces therein.

Other objects are simplicity and economy of construction, compactness and economy of space, dependability and efficiency of operation, and adaptability for use in a wide variety of applications requiring filtration of oil or other material.

Figure 2:
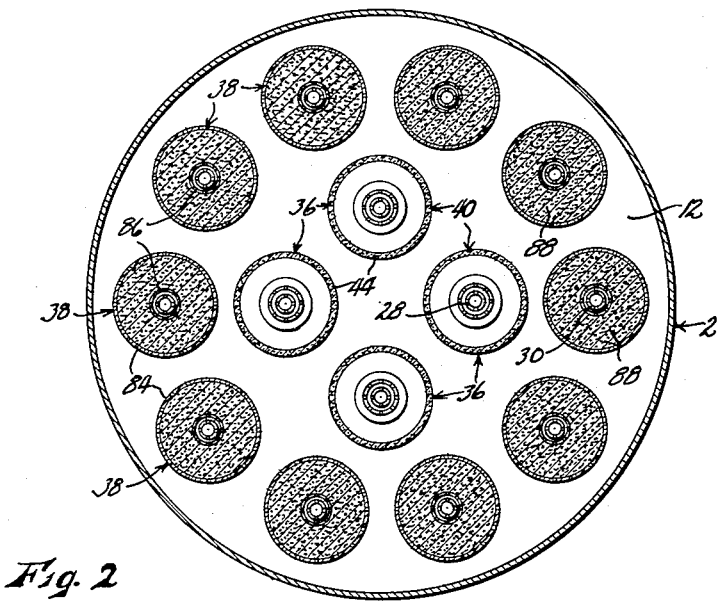
Figure 3:
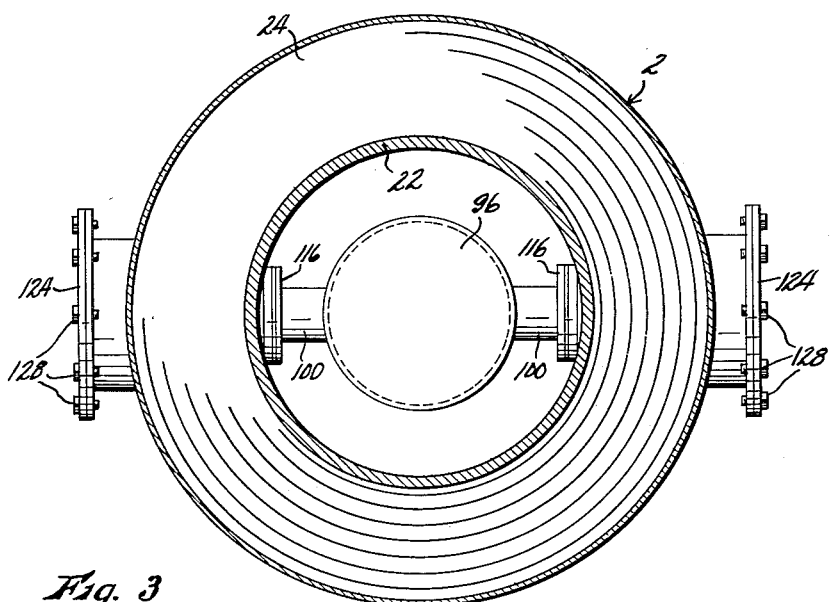

With these objects in view, as well as other objects which will appear in the course of the specification, reference will be had to the drawing, wherein:

Fig. 1 is a vertical, central sectional view through a combined filter and strainer device embodying the present invention, with parts left in elevation, and with a lubrication system incorporating said device shown schematically, Figs. 2 and 3 are sectional views taken respectively on lines II—II and III—III of Fig. 1, and Figs. 4, 5 and 6 are enlarged, foreshortened, fragmentary sectional views taken respectively on lines IV—IV, V—V, and VI—VI of Fig. 1.

Like reference numerals apply to similar parts throughout the several views, and the numeral 2 applies generally to a casing or housing having the form of a metal tank capable of holding the pressure of the oil line. It is provided at its upper end with a cover 4 retained thereon by swing-bolts 6 and sealed by gasket 8. The casing is divided by a horizontal partition wall 10 into an upper or filter chamber 12 having an inlet 14, and a lower or strainer chamber 16 having a drain plug 18. The casing is supported by legs 20. A conically shaped wall 22 is disposed in the upper portion of chamber 16, being secured at its upper edge to wall 10 and at its lower edge to the cylindrical wall of casing 2, whereby to form an annular chamber 24 having an outlet pipe 26.

Figure 4:
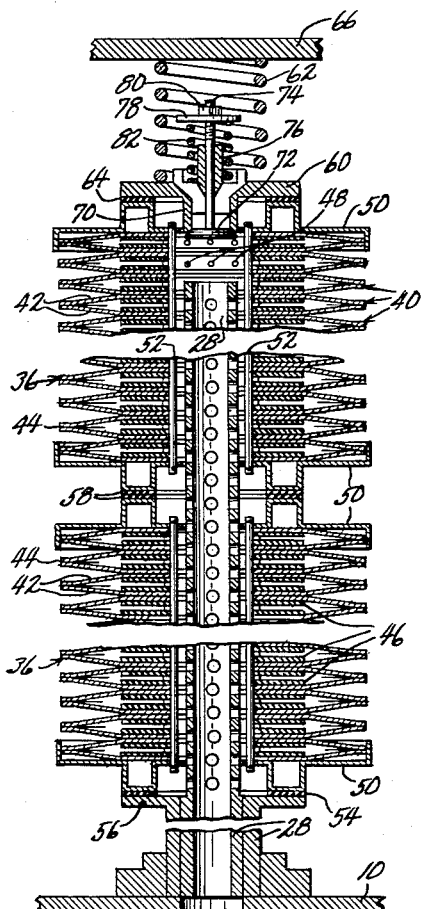

Rigidly attached to and extending upwardly from wall 10 are a plurality of perforated standpipes 28 and 30. Standpipes 28 are disposed centrally of wall 10, and communicate directly with strainer chamber 16 through holes 32 formed in said wall. Standpipes 30 are disposed around the edge portions of wall 10, and communicate with chamber 24 through holes 34 formed in said wall. Sandpipes 28 each carry a pair of full-flow filter cartridges 36, and each of standpipes 30 carries a pair of by-pass filter cartridges 38. As best shown in Figs. 2 and 4, each full-flow cartridge 36 may constitute a stack of wafers 40 each formed from a pair of annular discs 42 of filter paper or the like. Said discs are secured together around their outer peripheral edges as by adhesive 44, and are spaced apart at their inner peripheral edges by annular spacers 46 having apertures 48 therein opening into the central aperture of the wafer. The wafers are stacked together in generally cylindrical form and held together between end plates 50 by tie rods 52. The cartridges are placed over a standpipe 28. The lower end of the lower cartridge is sealed by a gasket 54 on a flange 56 of the standpipe. The contiguous ends of the two cartridges are sealed by gaskets 58, and the top end of the upper cartridge is sealed by a cap member 60 urged thereagainst by a spring 62, a gasket 64 being disposed between said cap and said cartridge. The upper end of said spring bears against the lower surface of an annular plate 66 fixed in cover 4 by means of struts 68. Thus when the cover is removed, the filter cartridges may be removed and replaced whenever necessary.

The above recited construction of the full-flow cartridge is exemplary only. It will be understood that any cartridge having a high-capacity and low pressure drop may be utilized. They must be capable of processing the full flow of oil to be filtered, at acceptable pressure and power requirements. This type of filter, however, cannot prevent the gradual accumulation of oxides, very fine sludges and other fine impurities in the oil. Filters such as by-pass cartridges 38 are available which are capable of removing even these very fine impurities, but a device embodying only cartridges of this type would be prohibitive in size, cost, and power requirements. In the full-flow cartridges as described, the oil in filter chamber 12 passes inwardly through single layers of filter paper 42 into the interiors of wafers 40, and thence through apertures 48 of spacers 46, into standpipes 28 through the perforations thereof, and downwardly through said standpipes into strainer chamber 16.

Each of cap members 60 is provided with a pressure relief valve as best shown in Fig. 4. Said cap member has a tubular hub 70 the lower end of which forms a valve seat. Cooperating with said seat is a valve disc 72 mounted on a stem 74 which extends upwardly from said disc and is disposed slidably in a sleeve 76 integral with the cap. A washer 78 is secured adjustably on the upper end of said stem by a nut 80, and a spring 82 is compressed between said washer and the cap, whereby disc 72 is urged upwardly against the valve seat. Whenever the pressure in filter chamber 12 exceeds a level, which is predetermined by turning nut 80 to vary the tension of spring 82, disc 72 will be forced downwardly from its seat and oil will pass directly from chamber 12 into standpipes 28 without passing through filter wafers 40. The circumstances of this occurrence will be set forth fully below.

Figure 5:
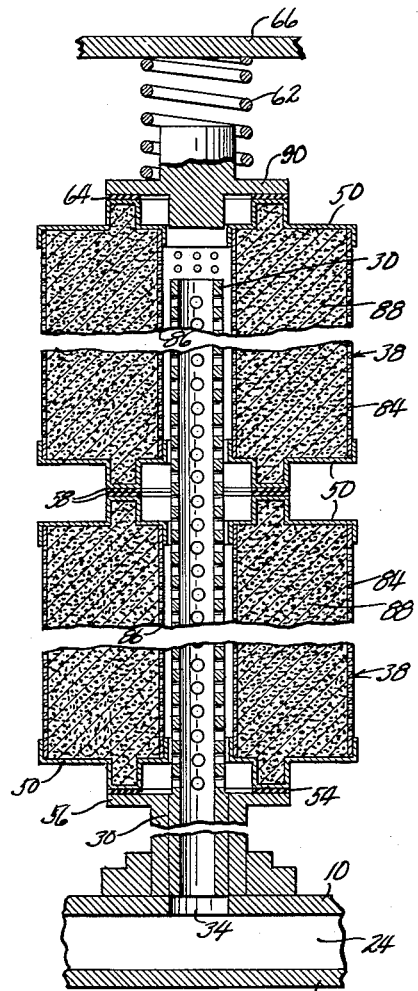

As best shown in Figs. 2 and 5, each of by-pass filter cartridges 38, by way of example only, may each comprise an outer cylinder 84 and an inner cylinder 86, both perforated, said cylinders being disposed concentrically to form an annular chamber containing a filter medium 88 which may be fuller's earth, waste, cellulose or the like. The ends of each cartridge are closed by end plates 50 corresponding to those of the full-flow cartridges. The by-pass cartridges are placed over each standpipe 30, and are sealed by gaskets 54, 58 and 64, and by cap 90 and spring 62, in the same manner as the full-flow cartridges. However, the cap member 90 associated with each by-pass standpipe, which corresponds to cap 60 of the full-flow cartridges, is solid and imperforate, not being supplied with a pressure relief valve as is each cap 60.

Here again the specific structure of the by-pass cartridges shown is exemplary only. The essential property thereof is that they be capable of removing the very fine impurities previously mentioned. It will be obvious, however, that in this "depth-type" or "absorption" filter, the oil must pass through a relatively thick bed of the filtering medium, and must be retained therein for a relatively long period of time to permit absorption of impurities therefrom. The oil passes inwardly through the cartridges, then downwardly through standpipes 30 into chamber 24, and thence through outlet pipe 26. Said outlet pipe is equipped with an orifice plate 92 having an orifice 94 formed therethrough for restricting the flow of oil, for a purpose to be discussed.

Figure 6:
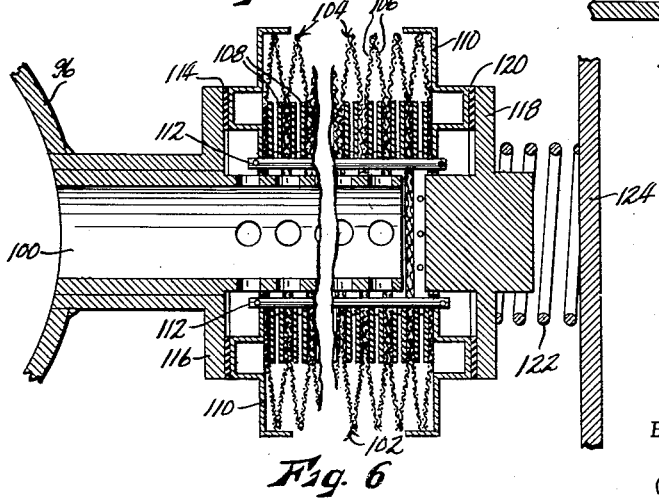

The strainer system carried in strainer chamber 16 is best shown in Figs. 1, 3 and 6. Disposed centrally in chamber 16 is a smaller cylindrical outlet chamber 96 into which the main outlet pipe 98 is interconnected. Extending horizontally outwardly from chamber 96, within chamber 16, are a pair of perforated standpipes 100. Mounted on each of said standpipes is a strainer cartridge 102 similar in most respects to the full-flow cartridges 36. It comprises a series of wafers 104 each formed of a pair of annular discs 106 (Fig. 6), which are, however, a fine mesh screen rather than filter paper as in cartridges 36. Discs 106 of each wafer are bound together at their outer peripheral edges, and have their inner peripheral edges held apart by perforated annular spacers 108. The wafers are held together under pressure between end plates 110 by tie rods 112. The cartridge thus formed is applied over standpipe 100, the inner end of said cartridge being sealed by gasket 114 against a flange 116 of said standpipe, and the outer end thereof being sealed by a cap 118 and gasket 120 held thereagainst by a spring 122. The opposite end of said spring bears against a closure plate 124 which is provided for an opening 126 in the outer wall of chamber 16, and which is held in place by screws 128. When said closure plates are removed, the strainer cartridges may be removed and replaced through openings 126. The strainer cartridges may be of other constructions than that specified, so long as they are capable of performing a rough or coarse filtration of the oil. They are intended in the present structure, only as stand-by units to afford a degree of protection in the event of failure of the full-flow and by-pass cartridges.

A system utilizing my invention is shown diagrammatically in Fig. 1. An engine the lubricating oil of which is to be filtered is indicated at 130. Said engine drives an oil pump 132 which elevates oil from a sump 134 through a conduit 136, and delivers it under pressure through a conduit 138 to the inlet 14 of casing 2. The full-flow outlet 98 of the filter device is connected by conduit 140 to the lubricating system of the engine, indicated generally at 142, from whence it flows back to sump 134 through conduit 144. The by-pass outlet 26 of the filter device is connected by conduit 146 directly to sump 134, which is of course customarily at atmospheric pressure.

The operation of the system is substantially as follows. Oil entering filter chamber 12 through inlet 14 under pressure will of course tend to flow through and be filtered, by both the full-flow cartridges 36 and the by-pass cartridges 38, the proportion flowing through each type of cartridge depending on the relative resistance to flow of said cartridges. It is well known that by-pass cartridges of the type shown will pass oil only very slowly, if at all, when the oil is cold, and it will therefore be apparent that if engine 130 has just been started and the oil is cold, most of the oil must flow through full-flow cartridges 36, and thence through standpipes 28, chamber 16, strainer cartridges 102, standpipes 100, chamber 96, outlet 98 and conduit 140 to the lubricating system 142 of the engine, and thence back to sump 134 through conduit 144. Under conditions such as extreme cold, oil may not pass initially even through full-flow cartridges 36. In that event, oil pressure in the filter chamber will increase until it exceeds the setting of relief valves 72, whereupon said valves will open and pass oil directly into standpipes 28 and thence through strainers 102 as previously described, without actual filtration. This is not considered objectionable, however, since the strainers will give adequate protection for the short time required for the oil to be heated sufficiently to pass through the paper surfaces of the full-flow cartridges. When this occurs, the filter chamber pressure will drop and relief valves 72 will close. By-pass filters 38 are not provided with relief valves, which results in the fact that unfiltered oil can never enter chamber 24 and conduit 146 which are not protected by strainers.

Assuming now that the full-flow cartridges 36 are passing oil but that the oil is not yet hot enough to flow through the by-pass cartridges, the oil flowing to cartridges 36 will also circulate freely around cartridges 38, since both sets of cartridges are in the same case, and cartridges 38 will be heated thereby. When they have been warmed sufficiently, oil will begin to flow therethrough, and thence through standpipes 30, chamber 24, outlet 26, orifice 94 and conduit 146 to sump 134, where it is again recirculated. It is not practical to return the by-pass oil into the lubricating system pressure line 149, since the relatively great flow resistance of the by-pass units drops the pressure in line 146 below that in line 149. The delay in the start of flow through the by-pass cartridges is not considered objectionable, since the impurities requiring their use accumulate slowly. Furthermore, the system eliminates the necessity of steam jackets, electric heater coils, or other heating means heretofore necessarry with by-pass filters to maintain the necessary temperature. Instead, the by-pass elements are heated directly by the flow of warm oil to the full-flow elements.

The proportioning of the oil between the full-flow and by-pass units depends of course on the overall resistance to flow thereof. As previously discussed, by-pass cartridges 38 intrinsically have a greater flow resistance than the full-flow cartridges, so that more oil will tend to pass through the full-flow units. However, the overall proportioning of the oil between the two types of units is not in itself particularly important or critical, and could easily be varied by placing other resistances in the flow paths of the two types of units, or by changing the number of one type of unit as compared to the other. More important is that whatever proportion of the oil flows through the by-pass cartridges, it should be retained therein for a time sufficient to allow absorption of impurities therefrom by the filtering medium. Passage of oil through a depth-type absorption filter at too high a rate will result in poor filtering efficiency. It has been determined that if 5%–10% of the oil passes through the by-pass cartridges with proper retention time therein, the total oil will remain sufficiently pure and free of impurities, without undue increases in space and power requirements. Therefore the problem is to maintain at least a 5–10% flow in the by-pass cartridges, with adequate retention time. Obviously the size and number of by-pass cartridges must be such as to provide these requirements under poor operating conditions such as low temperature, high viscosity, dirty oil and clogged cartridges, within operating limits. Minimum operating conditions such as these generally do not exist, however, and excessive flow with insufficient retention time in the by-pass cartridges would occur if the by-pass line were not further restricted. The orifice plate 92 provides this restriction. It may of course be interchanged with other plates having different sizes of orifice 94 therein, in order to provide a flow restriction sufficient to provide the retention time required, or an adjustable throttling valve could be used in place of the orifice plate.

Although I have shown and described a specific embodiment of my invention, it will be readily apparent that numerous minor changes of structure and operation could be made without departing from the spirit of the invention as defined by the scope of the appended claims.

What I claim as new and desire to protect by Letters Patent is:

1. A combination filter comprising a casing defining a filter chamber having an inlet for liquid material to be filtered and a pair of outlets, a full-flow filter device disposed in said chamber and operable to filter liquid leaving said chamber through the first of said outlets, and a by-pass filter device disposed in said chamber and operable to filter liquid leaving said chamber through the second of said outlets, said full-flow filter device comprising a surface-type filter having low flow resistance, and said by-pass filter device comprising a depth-type absorption filter having a relatively high flow resistance, said full-flow and by-pass filter devices being so disposed in said filter chamber that liquid flowing from said inlet to said full-flow filter device will be circulated about said by-pass filter device.

2. A combination filter comprising a casing defining a filter chamber having an inlet for liquid material to be filtered and a pair of outlets, a full-flow filter device disposed in said chamber and operable to filter liquid leaving said chamber through the first of said outlets, and a by-pass filter device disposed in said chamber and operable to filter liquid leaving said chamber through the second of said outlets, said full-flow filter device comprising a surface-type filter having low flow resistance, and said by-pass filter device comprising a depth-type absorption filter having a relatively high flow resistance, said casing also defining a strainer chamber into which liquid is introduced from said first outlet of said filter chamber, said strainer chamber having an outlet and a strainer disposed in said strainer chamber and operable to strain liquid leaving said strainer chamber through said outlet, whereby to remove impurities from the liquid in the event of rupture or failure of said full-flow filter device, and a pressure relief valve disposed in a flow passage interconnecting said filter chamber with said strainer chamber in by-passing relation to said full-flow filter device, said valve being automatically operable to open whenever the filter chamber pressure exceeds a predetermined level.

References Cited in the file of this patent

UNITED STATES PATENTS

| 1,906,418 | Renfrew et al. | May 2, 1933 |
| 2,253,686 | Burckhalter | Aug. 26, 1941 |
| 2,429,321 | La Brecque | Oct. 21, 1947 |
| 2,545,374 | Nugent | Mar. 13, 1951 |
| 2,617,535 | Hamilton | Nov. 11, 1952 |
| 2,685,371 | Gretzinger | Aug. 3, 1954 |

FOREIGN PATENTS

| 551,531 | Great Britain | Feb. 26, 1943 |